United States Patent [19]
Lochbrunner et al.

[11] Patent Number: 5,746,168
[45] Date of Patent: May 5, 1998

[54] CYLINDER HEAD COVER OF AN INTERNAL COMBUSTION ENGINE

[75] Inventors: Eduard Lochbrunner, Hemmingen, Germany; Heiko Buss, El Paso, Tex.; Werner Haarer, Illingen; Andreas Oettinger, Bad Urach, both of Germany; Maximilian Kronberger, Steyr, Austria; Régis Blanc, Lyon/Frankreich, France; Gerhard Weiss, Neuhofen, Austria

[73] Assignee: Robert Bosch GmbH, Stuttgart, Germany

[21] Appl. No.: 803,653

[22] Filed: Feb. 21, 1997

[30] Foreign Application Priority Data

Feb. 23, 1996 [DE] Germany ............ 296 03 254 U

[51] Int. Cl.⁶ ............ F16J 10/00; F02M 39/00
[52] U.S. Cl. ............ 123/90.38; 123/195 C; 123/470; 439/34; 439/130
[58] Field of Search ............ 123/90.37, 90.38, 123/195 C, 198 E, 470; 439/34, 130

[56] References Cited

FOREIGN PATENT DOCUMENTS 38 26 144 A1 2/1990 Germany.

*Primary Examiner*—Weilun Lo
*Attorney, Agent, or Firm*—Kenyon & Kenyon

[57] ABSTRACT

A cylinder head cover of an internal combustion engine with a solenoid-controlled injection device using pump-nozzle units designed so that the solenoid valves are supplied with power in a manner that is advantageous from the manufacturing point of view and provides reliable operation. For this purpose, the cylinder head cover covers the entire injection device and contact elements designed as inserts are injected into the cylinder head cover made of plastic in an injection molding process. The contact elements automatically come into a close-fitting contact with contact surfaces mounted on the outside of the solenoid valves when the cylinder head cover is mounted on a cylinder head. The contact elements are combined with contact segments in a central connector mounted on the outside of the cylinder head cover, wherein the power is supplied for the solenoid valves centrally from a controller.

5 Claims, 1 Drawing Sheet

1

CYLINDER HEAD COVER OF AN INTERNAL COMBUSTION ENGINE

FIELD OF THE INVENTION

The present invention is related to a cylinder head cover of an internal combustion engine with a solenoid-controlled injection device.

BACKGROUND OF THE INVENTION

A cylinder head cover of an internal combustion engine is known from German Patent Application No. 38 26 144 Al, where the cylinder head cover houses drive elements for an injection device arranged in a cylinder head. The injection device has, for each cylinder of the internal combustion engine, a pump-nozzle unit with a solenoid valve to control fuel delivery. Each solenoid valve is provided with terminals for an electric power supply. Mating connectors are connected to each of these terminals, each of which is provided with cables ultimately leading to a controller.

This configuration of the power supply for the pump-nozzle units' solenoid valves has a bulky design, is subject to failure due to the many cables and connectors, and is difficult as well as time-consuming to manufacture.

SUMMARY OF THE INVENTION

The cylinder head cover of an internal combustion engine with a solenoid-controlled injection device according to the present invention has the advantage that the aforementioned inconveniences are eliminated to a satisfactory degree. For this purpose, the cylinder head cover is designed so that the solenoid valves' power supply terminals are contacted as the cylinder head cover is placed on the cylinder head.

In this manner, a bulky power supply arrangement is avoided, its susceptibility to failure is reduced, and its manufacture is made simpler, more cost-effective, and less time-consuming.

DETAILED DESCRIPTION

Figure 1:
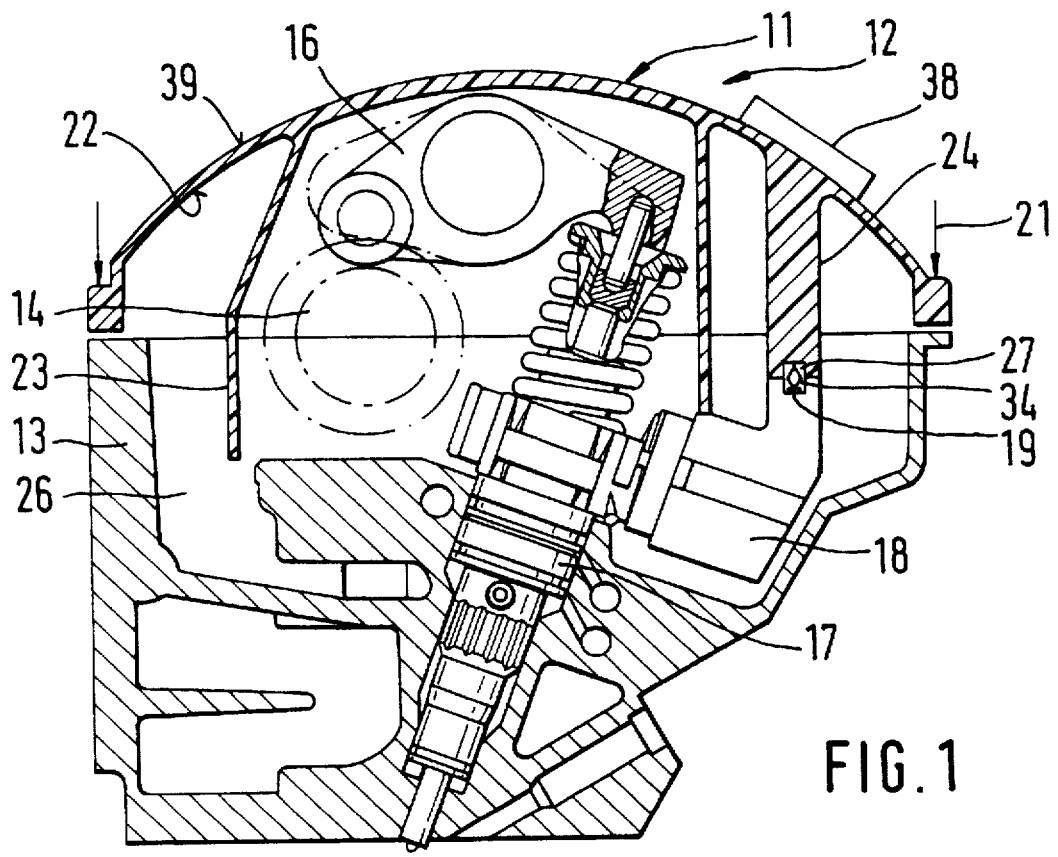
FIG. 1 is a side view and partial cross-section of the entire arrangement according to the present invention.
Figure 2:
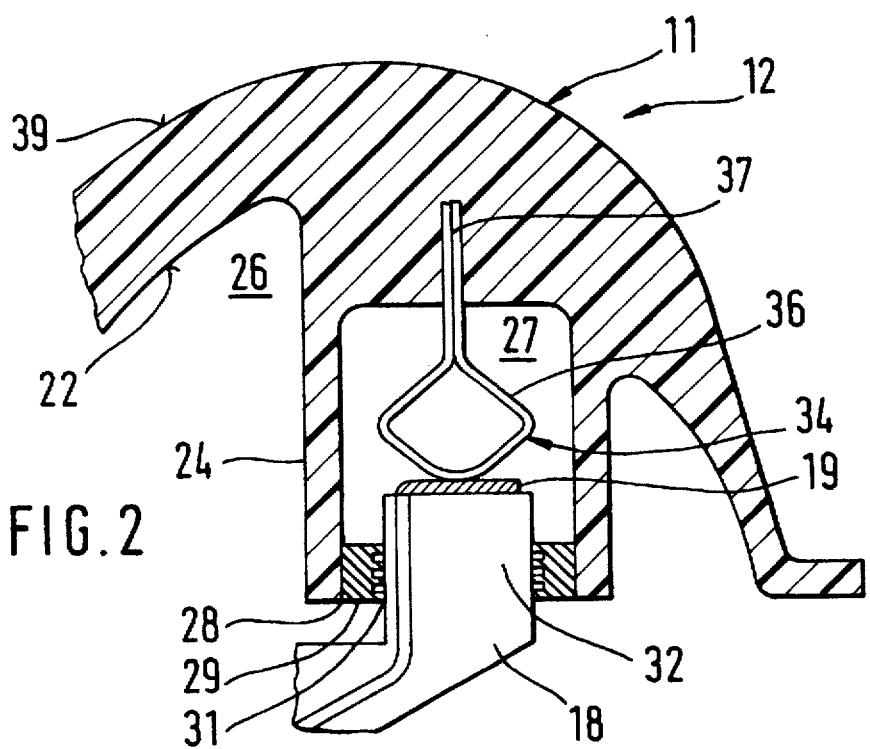
FIG. 2 shows a contact point.

A cylinder head cover 11, illustrated in FIGS. 1 and 2, of an internal combustion engine is part of a solenoid-controlled injection device 12 arranged in or on a cylinder head 13, assigned to a cylinder of a multicylinder diesel engine, which it supplies with fuel. Injection device 12 comprises, in a well-known manner, a pump-nozzle unit 17, driven by a camshaft 14 of an internal combustion engine via a rocker arm 16, with a solenoid valve 18, through which the fuel delivery to pump-nozzle unit 17 is controlled.

Solenoid valve 18 is electrically driven and has external contact surfaces 19 as power supply terminals.

Each cylinder head cover 11, made of synthetic material, covers the entire injection device 12 and can be mounted reversibly on cylinder head 13 using screws symbolically represented through arrows 21 directed axially. Cylinder head cover 11 is dome-shaped and is aligned with cylinder head 13 with a concave inner part 22 so it can be mounted on said cylinder head. Sealing walls 23 enclosing drive elements 14, 16 of pump-nozzle units 17, and first contact supports 24, each assigned to a solenoid valve 18, go from inside 22 of cylinder head cover 11 as a single piece and, when cylinder head cover 11 is mounted, protrude into inner space 26 of cylinder head 13.

At the free end of each first contact support 24, a contact area 27 is formed as a recess with an inlet opening 28 provided with O-ring 29, as shown in FIG. 2, and opening to a through hole 31, through which a second contact support 32 is inserted with a close fit when cylinder head cover 11 is mounted. The front of second contact support 32 has a plate-shaped contact surface 19, provided with a contact element 34 of first contact support 24, spring-loaded for electric contact.

Contact elements 34 are partially connected to cylinder head cover 11 as inserts, in the form of pressed screens or, alternatively, as flexible foils, when said cylinder head cover is manufactured in an injection molding process. They protrude into contact areas 27 with bow-shaped contact segments 36 for a close fit with contact surfaces 19. Contact segments 36 can also be bent into a bow shape in order to spring-load them, or can be designed in some other manner to a similar effect.

Contact elements 34 are embedded, to a large degree, in the plastic mass of cylinder head cover 11 with their contact segments 37, and end in a central plug 38, as shown in FIG. 1, mounted on an outer surface 39 facing away from inside 22, into which central plug the power is supplied centrally from a controller (not illustrated) for solenoid valves 18.

The design of the contact point with a plate-shaped contact surface 19, which contacts, with a close fit, a spring-loaded bow-shaped contact element 34, results in a positive contact, provided contact surface 19 has an appropriate size, even when there is a tolerance in the relative positions of contact element 34 and contact surface 19.

With the partial embedding of contact elements 34 in cylinder head cover 11, an advantageous solution is created, from the manufacturing point of view, for the power supply of solenoid valves 18, which is compact and not prone to failure, and can also be assembled in a short time.

What is claimed is:

1. A cylinder head cover of an internal combustion engine with a solenoid-controlled injection device, the cylinder head cover covering drive elements for the injection device connected to a cylinder head, the injection device having a pump-nozzle unit for each cylinder of the internal combustion engine with a corresponding solenoid valve to control fuel delivery to each of the pump-nozzle units, comprising:

first and second contacts connected to each of the solenoid valves, the first contact being electrically coupled to the second contact, to supply power to the solenoid valves, when the cylinder head cover is mounted on the cylinder head.

2. The cylinder head cover according to claim 1, wherein the cylinder head cover covers the entire injection device.

3. The cylinder head cover according to claim 2, wherein the cylinder head cover is at least partially made of a synthetic material, and further comprising an inner surface, wherein the first contact is coupled to the inner surface such that an electrical coupling between the first contact and the second contact is enabled when the cylinder head cover is mounted on the cylinder head.

4. The cylinder head cover according to claim 3, wherein the first contact is spring-loaded in a first direction axial to a second direction in which the cylinder head cover is mounted on the cylinder head.

5. The cylinder head cover according to claim 4, further comprising an outer surface, wherein the first contact further includes a segment and a connector, wherein the segment is at least one of at least partially injected into the cylinder head cover and guided along the cylinder head cover to form the connector, and wherein the connector is coupled to the outer surface of the cylinder head cover to provide a connection to a power supply for the solenoid valves.

* * * * *